[19] United States Patent
Casperson

[11] Patent Number: 4,826,669
[45] Date of Patent: May 2, 1989

[54] METHOD FOR CARBON BLACK PRODUCTION

[75] Inventor: John R. Casperson, Bartlesville, Okla.

[73] Assignee: Phillips Petroleum Company, Bartlesville, Okla.

[21] Appl. No.: 11,953

[22] Filed: Feb. 6, 1987

Related U.S. Application Data

[63] Continuation of Ser. No. 528,921, Sep. 2, 1983, abandoned.

[51] Int. Cl.[4] .......................... C01B 31/02; C09C 1/48
[52] U.S. Cl. .................................. 423/456; 423/450; 423/457
[58] Field of Search ............... 423/445, 449, 450, 455, 423/456, 457, 460, 461; 422/150

[56] References Cited

U.S. PATENT DOCUMENTS

| | | | |
|---|---|---|---|
| 2,375,795 | 5/1945 | Krejci | 23/209.8 |
| 2,616,795 | 11/1952 | Krejci | 23/209.8 |
| 2,682,450 | 6/1954 | Sweigart et al. | 23/259.5 |
| 2,851,337 | 9/1958 | Heller | 23/209.4 |
| 2,967,762 | 1/1961 | Krejci | 423/456 |
| 3,375,075 | 3/1968 | Ruble | 23/209.4 |
| 3,498,753 | 3/1970 | Hokari et la. | 23/277 |
| 3,567,395 | 3/1971 | Henderson et al. | 423/456 |
| 3,922,335 | 11/1975 | Jordon et al. | 423/450 |
| 4,051,135 | 9/1977 | Vanderveen | 23/259.5 |
| 4,179,494 | 12/1979 | Rothbuhr et al. | 423/456 |
| 4,241,022 | 12/1980 | Kraus et al. | 422/156 |
| 4,267,160 | 5/1981 | Kraus et al. | 423/456 |
| 4,327,069 | 4/1982 | Cheng | 423/450 |
| 4,391,789 | 7/1983 | Estopinal | 423/450 |

FOREIGN PATENT DOCUMENTS 1359216 7/1974 United Kingdom .
2098972 12/1982 United Kingdom .

Primary Examiner—Gregory A. Heller
Attorney, Agent, or Firm—Williams, Phillips & Umphlett

[57] ABSTRACT

High structure carbon black is produced in an oil furnace reactor characterized by abrupt expansions in the reaction flow passage following the reactor throat.

3 Claims, 1 Drawing Sheet

METHOD FOR CARBON BLACK PRODUCTION

This application is a continuation of application Ser. No. 528,921, filed Sept. 2, 1983, now abandoned.

In one aspect, the invention relates to a new carbon black reactor. In another aspect, the invention relates to a new method for producing carbon black.

Although many types of carbon black reactors have been proposed, improvements to provide greater economy and flexibility of operation and even higher quality product could be desirable. For example, improvements in the structure capabilities of certain reactors and processes would be very desirable.

OBJECTS OF THE INVENTION

It is an object of this invention to provide a carbon black reactor and a manufacturing process to produce high-structure carbon black product when it is desired.

SUMMARY OF THE INVENTION

In accordance with certain aspects of the present invention, there is provided an improvement for a refractory-lined carbon black reactor having a reaction flow passage which is characterized by a first generally cylindrical zone having a longitudinal axis, a reactor throat having a first diameter, a generally frustoconical zone converging from the generally cylindrical zone to the reactor throat, and a generally cylindrical pyrolysis zone having a second diameter connected to the reactor throat, the reaction flow passage abruptly expanding from the first diameter to the second diameter to form an abrupt annular step. The improvement comprises a generally cylindrical transition zone having a third diameter positioned between the reactor throat and the pyrolysis zone so that the refractory forms a first abrupt annular step between the reactor throat and the transition zone and a second abrupt annular step between the transition zone and the pyrolysis zone. The second step is no further than about six times the first diameter from the first step. By providing the second step within this distance from the first step, the second step can influence the carbon forming reaction which is carried out in this reactor to provide high structure carbon black product.

In accordance with certain other aspects of the invention, there is provided improvement to a process for producing carbon black comprising flowing a stream of hot combustion gases having a temperature sufficiently high to decompose a carbonaceous feedstock and form carbon black through a reactor throat, introducing the carbonaceous feedstock transversely into the stream of hot combustion gases from the periphery of the stream from a position at or upstream of the throat to form a reaction mixture, and flowing the reaction mixture through an abruptly diverging zone immediately following the throat. The improvement comprises flowing the reaction mixture through a second abruptly diverging zone positioned within about six throat diameters from the reactor throat.

DETAILED DESCRIPTION OF THE INVENTION

Figure 1:
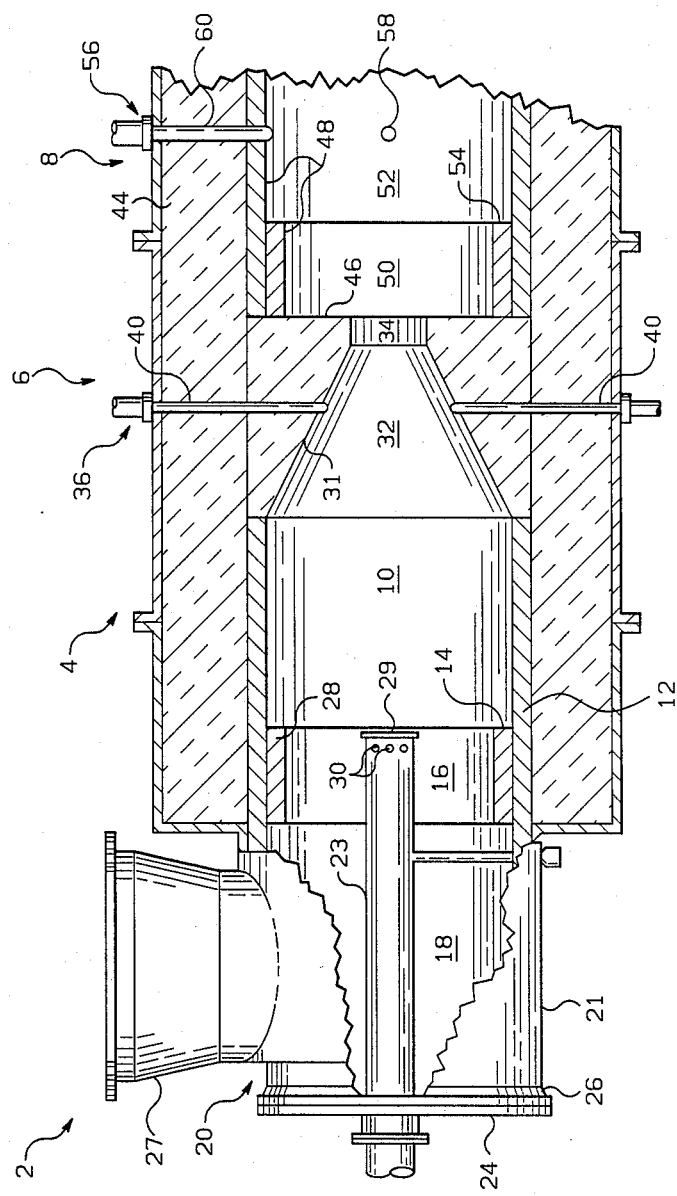
FIG. 1 illustrates certain features of one embodiment of the present invention.

According to certain aspects of the invention, an apparatus 2 comprises, serially arranged, a combustion zone 4, a mixing zone 6, and a pyrolysis zone 8.

Preferably, the combustion zone 4 comprises a combustion chamber 10 defined by a preferably generally cylindrical sidewall 12 and a generally annular upstream end wall 14 having a passage 16 therethrough generally axially directed into the generally cylindrical combustion chamber 10. The sidewall 12 and endwall 14 are generally formed from a refractory material to resist high temperatures.

Oxidant fluid and combustible fluid are introduced into the chamber 10 via the passage 16. Preferably, the passage 16 leads from a chamber 18 which is defined by a housing 20. The housing 20 can be formed from metal, such as steel, and preferably comprises a generally tubular sidewall 21. The chamber 18 extends from the passage 16 and is preferably in axial alignment therewith. A tubular member 23 extends through the chamber 18 axially and empties into the passage 16. Preferably, the tubular member 23 carries the combustible fluid which is mixed with oxidant fluid from the chamber 18 in the passage 16. The housing 20 is closed at its upstream end by a plate 24 affixed to a flange 26 which circumscribes the upstream end of the housing 20. The tubular member 23 enters the chamber 18 in an axial direction through the plate 24. An annulus can be provided around the tubular member 23 for the introduction of coolant if needed. A duct 27 opens into the chamber 18 through the sidewall 21. The duct 27 can open into the chamber 18 tangentially if desired, although a duct opening into the chamber 18 generally normally with respect to the longitudinal axis of the chamber 18 has been used with good results.

Preferably, the generally annular surface 14 is a part of a ring or choke 28 positioned between the chambers 18 and 10 and defining the passage 16, because the ring helps to distribute oxidant fluid from the chamber 18 into the chamber 10. The ring 28 can be formed from a section of tubular refractory. The tubular member 23 preferably empties into the passage 16 through a plurality of generally radially outwardly directed ports or orifices 30 passing through the sidewall of the tubular member 23 where a gaseous combustible fluid is utilized, for ease of fabrication and reliability of operation. A plate having a larger diameter than the tubular member to form a generally annular flange 29 is attached to the end of the tubular member 23 to seal it and act as a flame holder. Preferably, the flange 29 is positioned upsteam of the surface 14, most preferably about 2 inches into the zone 16, as measured from zone 18.

Generally, the reaction flow passage expands between the passage 16 and the chamber 10 from a first diameter to a second diameter such that the ratio between the first diameter and the second diameter is between about 0.3 and about 0.8. Usually, the ratio of the diameters of the flange 29 and the passage 16 is within the range of from about 0.05 to about 0.5.

The mixing zone 6 comprises a sidewall 31 formed from refractory defining a chamber 32 in axial alignment with and converging from the combustion chamber 10 to a throat 34 and a means 36 for introducing a carbonaceous feedstock through the sidewall 31 and into at least one of the converging chamber 32 and the throat 34. Preferably, the converging chamber 32 converges from an inlet having a diameter about the same as that of the combustion chamber 10 to an outlet having a diameter about the same as that of the throat 34. A converging chamber which converges at a half-angle of about 18°30' has been used with good results. The means 36 comprises one or more sets of ports for the positioning of carbonaceous feedstock injectors 40. Usually, the ports of a set will be circumferentially spaced about the reaction flow passage at a selected position with respect to the longitudinal axis of the reaction flow passage, with the ports being preferably equiangularly spaced from each other for uniform distribution of feedstock from the injectors 40 and into the reaction flow passage. The injectors can open into the throat or the converging zone. Preferably, the tip of each injector is positioned about flush with the reactor wall, to lessen heat exposure and cut down on coking and plugging and the injector 40 is positioned along a radius from the reactor axis. Feedstock can be introduced into the reactor from its axis if desired.

Where the feedstock is to be introduced generally normally into the reactor with respect to its axis, it is preferred to utilize tips or nozzles which are designed to emit a spray. Solid-cone type spray nozzles, which emit atomized feedstock at an angle of divergence of at least about 15°, preferably 60° or more can be used with good results. Jacket cooling air, not shown, can surround the oil injectors 40, flowing through the annulus between the oil tube and the wall of the port.

Because of very high temperatures in zone 8, heavy-duty refractory, such as chrome-alumina refractory (minimum 9 wt. % $Cr_2O_3$) manufactured by Didier-Taylor, Cincinnati, Ohio, is preferably employed for at least the construction of the zone 8. Conventional refractory can be used as lining 44. The mixing zone 8 is preferably formed so that it can be separately replaced if needed.

It is desirable to generate high turbulance in the reaction mixture when it passes from the mixing zone 6 to the pyrolysis zone 8, to disintegrate the carbonaceous feedstock to form high quality carbon black. It is therefore very important that the reaction flow passage undergo an abrupt expansion as it enters the pyrolysis zone from the mixing zone. Usually, the half angle of expansion will be at least 60°. Preferably, the half-angle of expansion will be near 90°, because a 90° configuration has been used with good results.

Where the half-angle of expansion is near 90°, the upstream end of the pyrolysis zone is defined by a generally annularly shaped end wall 46 which extends from the downstream end of the throat 34 to the upstream end of pyrolysis zone sidewall 48. The pyrolysis zone preferably has a generally circular cross-section in a plane normal to the axis of the reaction flow passage. The desired amount of expansion between the zones will depend on reactor flow conditions and the desired properties of the carbon black to be produced. Generally, the cross sectional area of the reaction flow passage defined by sidewall 48 in a plane normal to the reactor axis will be in the range of from about 2 to about 20 times larger than the cross sectional area of the reaction passage at the throat 34, usually from about 3 to about 12 times larger. An expansion ratio toward the lower end of this range tends to provide a carbon black product characterized by higher surface area and lower structure, while an expansion ratio toward the upper end of the range provides a carbon black product characterized by lower surface area and higher structure.

To raise the structure of the produced carbon black, there is provided a generally cylindrical transition zone 50 positioned between the pyrolysis zone 52 and the reactor throat 34. The transition zone 50 has a third diameter which is between the diameter of the throat 34 and the diameter of the pyrolysis zone 52. The refractory sidewall 48 forms a first abrupt annular step 46 between the reactor throat 34 and the transition zone 50 and a second abrupt annular step 54 between the zone 50 and the zone 52. If desired, the pyrolysis zone 8 can be provided with a plurality of abrupt annular steps 54 at its upstream end.

The second annular step 54 is preferably positioned no further than about six times the diameter of the throat 34 from the step 46, preferably within 3 diameters such as in the range of 0.1-3 diameters from the step 46. It is crucial to this invention that the reaction mixture be in a reactive form as it flows past the steps 46 and 54 so that the properties of the carbon black being produced can be influenced. Generally, the diameter of the reactor throat 34 will be between about 4 inches and about 15 inches and the second step 54 will be no further than about 30 inches from the first step. In order to assure that the pyrolysis mixture is in a highly reactive state as it flows past the shoulders or steps 46 and 54, the feedstock injectors should not be positioned too far upstream from the throat 34. Preferably, the feedstock injectors 40 will open into the reaction flow passage from the periphery of the generally frustoconical zone 32 or the reactor throat 34 and be oriented generally toward the longitudinal axis of the reaction flow passage, generally at a distance of between about 0.1 and about 3 throat diameters upstream from the first abrupt annular step 46, usually 0.2 to 2 throat diameters upstream from the step 46. Usually, this will mean that the feedstock injectors will be positioned no further than about 30 inches upstream from the annular shoulder 46 and preferably within about 50 inches upstream from the second abrupt step 54. Preferably, the diameter of each transition zone or section is sufficient so that the reaction flow passage expands in cross-sectional area as measured in a plane normal to the reactor axis at least about 10 percent for each expansion through which it flows. Where a single transition section is used, the zone 50 will preferably have a diameter between about 1.2 and about 4 throat diameters, preferably from 1.5 to about 2.5 throat diameters sufficient so that the area ratio between the zone 50 and the throat 34 is in the range of from about 1.5:1 to about 16:1, preferably 2:1 to about 6:1. The diameter ratio between the zone 52 and the zone 50 is generally in the range of 1.05:1 to about 3.1, preferably between about 1.5:1 to about 2.5:1, so that the cross-sectional area ratio between the pyrolysis zone 52 and the transition zone 50 is from about 1.1:1 to about 10:1, preferably from about 2:1 to about 6:1. The length of the transition section will generally be in the range of from about 0.1 to 6 times the diameter of the throat 34, usually from about 0.1 to 3 throat diameters, most preferably in the range of 0.5 to about 2 throat diameters.

The pyrolysis zone 8 is further provided with a means 56 for supplying cooling fluid to the reaction flow passage. Generally, the means 56 comprises ports 58 opening into the pyrolysis zone 8 and at least one of the ports 58 carries a tube and spray nozzle assembly 60 for introducing a quench fluid into the zone 8 to stop the pyrolysis reaction. Generally, the means 56 will be positioned downstream of the outlet of the throat at a distance of from about 5 to about 45 throat diameters, usually at a distance of between about 8 and about 20 throat diameters. In other terms, the means 56 will generally be positioned between about 3 feet and about 20 feet downstream of the throat. Positioning the means 56 close to the throat produces low photolometer product. Usually, the means 56 is positioned downstream from the throat at a distance to produce a photolometer value of at least about 70, preferably at least 90, and is preferably designed to spray water. Further downstream of the quench means 56, the reaction mixture is further cooled to facilitate handling, and can be processed in conventional equipment.

Certain aspects of the invention are carried out according to a process comprising flowing a stream of hot combustion gases having a temperature sufficiently high to decompose a carbonaceous feedstock and form carbon black through a throat, a first abruptly diverging zone and a second abruptly diverging zone; and introducing the carbonaceous feedstock transversely into the stream of hot combustion gases from the periphery of the stream for decomposition to form the carbon black.

Generally, the oxidant fluid comprises air, since it is inexpensive and plentiful, preferably preheated air at a temperature of from about 700° to about 1250° F., since employing preheated air is an inexpensive method of supplying heat to the reactor to drive the pyrolysis reaction and aids in forming a high-structure product.

Generally, the combustible fluid will comprise mostly methane, because methane is the major component of natural gas and synthetic natural gas and these materials are suitable combustible fluids and are inexpensive. Other combustible fluids, containing one or more components, for example selected from hydrogen, carbon monoxide, acetylene and propane are also suitable.

Liquid fuels such as are used in some carbon black plants can also be used in the present invention. In some plants part of the feedstock is used as fuel.

Generally, stoichiometric or excess air is mixed with the combustible fluid and ignited as the mixture is introduced into the combustion zone. By stoichiometric is meant an amount which results in the essential absence of both molecular oxygen and combustible materials in the combustion gases. A greater than stoichiometric amount of air, commonly called "excess" air, will result in the presence of reactive oxygen in the combustion gases. Fifty percent excess air is frequently used in carbon black manufacturing processes, and this means that 150% of the stoichiometric amount of air has been mixed with the combustible fluid.

The carbonaceous feedstock which is injected into the combustion gas stream from its periphery is generally any of the hydrocarbon feeds suitable for forming carbon black. Generally, the carbonaceous feedstock will be a liquid and contain about 90 weight percent carbon. Highly aromatic oils generally make good feedstocks. Preferably, the feedstock will be characterized by a Bureau of Mines Correlation Index, BMCI, of between about 90 and about 150. The carbonaceous feedstock is preferably preheated to a temperature in the range of 250° to about 500° F. prior to injection into the combustion gases. It is important that the streams of feedstock do not penetrate sufficiently far to impinge on the wall of the reactor. However, to insure adequate dispersal, it is preferred that the feedstock be injected at a pressure of at least 50 psig. It will be appreciated that injecting the feedstock through a smaller orifice requires a higher pressure to achieve the same penetration.

The invention is illustrated by the following example.

EXAMPLE

The runs were made in a pilot plant reactor. A is the diameter of zone 10. B is the diameter of throat 34. C is the diameter of zone 52. D is the length of zone 10. E is the length of zone 32. α is the angle at which the sidewall of zone 32 converges toward the longitudinal axis of the reactor. F is the length of throat 34. G is the length of zone 52 from wall 56 to quench 60. H is the distance of oil injectors 40 upstream from wall 46, and J is the diameter of zone 16. The gas burner upstream of zone 10 was modified from that shown by the figure as follows:

Premixed air and fuel were supplied axially into the passage 16 through the end of a tube having a 4 inch inside diameter and terminating 2" upstream of wall 14. The end of the tube was partially closed by a radially inwardly extending annular flange having an inside diameter of 2.5 inches. Results are shown in Table I.

TABLE I

| RUN NUMBER | 1 | 2 |
|---|---|---|
| Reactor Dimensions, Ins. | | |
| A | 6 | 6 |
| B | 1.67 | 1.67 |
| C | 3 | 3 × 6$^{(a)}$ |
| D | 6 | 6 |
| E | 8.5 | 8.5 |
| F | 3.5 | 3.5 |
| G (Inlet C to Quench) | 72 | 39 |
| H | 6.5 | 6.5 |
| J | 4 | 4 |
| α Degrees, Approx. | 15 | 15 |
| Ratio C/B Diameters, | 1.8 | 1.8 × 3.6$^{(a)}$ |
| Nozzle: | | |
| Orifice Diam.ins. | 0.039 | 0.039 |
| No. of Nozzles | 2 | 2 |
| Spacing, degrees | 180 | 180 |
| PROCESS FLOW | | |
| Total Air, SCF/hr. | 13832 | 14002 |
| Temperature, °C. | 563 | 562 |
| Fuel, SCF/hr. | 885 | 886 |
| BTU/SCF | 948 | 956 |
| Air/Fuel Gas Vol. Ratio | 15.6 | 15.8 |
| Oil, GPH | 24.5 | 24.6 |
| API, 60° F./60° F. | −2 | −2 |
| Lbs/Gallon | 9.1 | 9.1 |
| BMCI | 138 | 138 |
| Carbon, wt. % | 91.3 | 91.3 |
| Temperature, °C. | 154 | 153 |
| Pressure,psig | 125 | 140 |
| Air to Oil, SCF/gal. | 565 | 569 |
| PRODUCT CARBON BLACK | | |
| Lbs/Gal. Feed | 5.2 | 5.3 |
| CTAB, m$^2$/g | 105 | 107 |
| N$_2$SA, m$^2$/g | 105 | 112 |
| 24M4 DBP, cc/100 g | 94 | 106 |
| Tint | 119.8 | 115.4 |
| Tint Residual | +7.2 | +4.9 |
| Photelometer | 78 | 82 |
| Lbs BlackGal × CTAB M$^2$/g | 546 | 567 |
| Lbs Black/ Lb C in Feed | 0.6259 | 0.6379 |
| Lbs Black/Lb C | 65.7 | 68.3 |

TABLE I-continued

| RUN NUMBER | 1 | 2 |
| --- | --- | --- |
| in Feed × CTAB m²/g | | |
| Oil-Lbs Carbon/Gallon | 8.31 | 8.31 |
| Lbs Carbon/Hr-Fuel | 28.1 | 28.1 |
| Lbs Carbon/Hr-Oil | 203.6 | 204.4 |
| Total Lbs Carbon/Hour | 231.7 | 232.5 |
| Lbs CB/Hour | 127.4 | 130.4 |
| Lbs CB/Lb-Total C | 0.5498 | 0.5609 |
| Lbs CB/Lbs Total C × CTAB | 57.7 | 60.0 |

$(a)$This is a two stage or stepped zone. The 3-inch diameter zone was 9 inches in length for run 2, and the 6 inch diameter zone was 30 inches in length to quench injection.

Runs 1 and 2 show that changing the dimensions of C, using a 3 inch diameter throughout for 72 inches in run 1, but using C of 3 inches diameter for 9 inches and then 6 inches in diameter for 30 inches to quench for run 2, there resulted in an extremely large gain in 24M4 value for run 2 from 94 for run 1 to 106 for run 2, at about the same CTAB values and at about the same tint residuals. In addition, the change in C in run 2 increased the yield of carbon black in pounds per gallon of oil, this quantity being 5.2 for run 1 and 5.3 for run 2.

That which is claimed is:

1. In a process for producing carbon black from a carbonaceous liquid feedstock comprising introducing air and fuel axially into a combustion zone for combustion therein to form a stream of hot combustion gases having a temperature sufficiently high to decompose said carbonaceous feedstock and form carbon black;

axially flowing said stream of hot combustion gases serially through a co-axially arranged group of cross-sectionally circular zones comprising a converging zone, a reactor throat zone having a throat diameter, and a pyrolysis zone having a pyrolysis zone diameter which is larger than said throat diameter, said pyrolysis zone being connected to said reactor throat zone by a first generally radially outwardly extending annular wall at the outlet of said throat zone, said reactor throat zone having a diameter in the range from about 4 to 15 inches;

introducing said carbonaceous feedstock transversely into said stream of hot combustion gases before said pyrolysis zone to form a reaction mixture; and introducing a quenching fluid into said pyrolysis zone at a location downstream of said first wall;

the improvement comprising the steps of:

injecting said carbonaceous feedstock into said converging zone at a location therein which is between about 0.1 and 3 throat diameters longitudinally upstream of said first wall, and flowing said reaction mixture through said reactor throat zone and then through said pyrolysis zone past said first wall and then past a second radially outwardly extending wall located in said pyrolysis zone before said quenching fluid introduction location, the diameter of said pyrolysis zone between said first wall and said second wall being between 1.2 and 4 throat diameters, the length of said pyrolysis zone between said first wall and said second wall being between about 0.1 and 6 throat diameters, the ratio of the diameter of said pyrolysis zone after said second wall to the diameter of said pyrolysis zone between said first wall and said second wall being between about 1.05:1 and 3:1, and said quenching fluid introduction location being located from about 5 to 45 throat diameters downstream of said first wall.

2. A process of claim 1 wherein the diameter of said pyrolysis zone between said first wall and said second wall is between about 1.5 and 2.5 throat diameters, and the length of said pyrolysis zone between said first wall and said second wall is between about 0.5 and 2 throat diameters.

3. A process of claim 1 wherein said carbonaceous feedstock is so introduced upstream of said first wall at a distance ranging from about 0.2 to 2 throat diameters.

* * * * *